United States Patent
Grohowski, Jr. et al.

(10) Patent No.: US 11,987,872 B2
(45) Date of Patent: May 21, 2024

(54) MICROSTRUCTURAL HOMOGENIZATION OF ADDITIVELY MANUFACTURED TITANIUM ARTICLES

(71) Applicant: Praxis Powder Technology, Inc., Queensbury, NY (US)

(72) Inventors: Joseph A. Grohowski, Jr., Glen Falls, NY (US); Paul H. Sheffield, Queensbury, NY (US)

(73) Assignee: Praxis Powder Technology, Inc., Queensbury, NY (US)

(*) Notice: Subject to any disclaimer, the term of this patent is extended or adjusted under 35 U.S.C. 154(b) by 55 days.

(21) Appl. No.: 17/476,349

(22) Filed: Sep. 15, 2021

(65) Prior Publication Data
US 2022/0002855 A1 Jan. 6, 2022

Related U.S. Application Data

(63) Continuation of application No. PCT/US2020/022868, filed on Mar. 15, 2020.
(Continued)

(51) Int. Cl.
*C22F 1/18* (2006.01)
*B22F 3/15* (2006.01)
(Continued)

(52) U.S. Cl.
CPC .......... *C22F 1/183* (2013.01); *B22F 3/15* (2013.01); *B22F 10/64* (2021.01); *B33Y 40/20* (2020.01);
(Continued)

(58) Field of Classification Search
CPC ......... C22C 1/0458; C22C 14/00; C22F 1/02; C22F 1/183; B22F 10/20; B22F 10/22;
(Continued)

(56) References Cited

U.S. PATENT DOCUMENTS

| 4,923,513 A | 5/1990 | Ducheyne |
| 2014/0127068 A1 | 5/2014 | Ward-Close |

(Continued)

FOREIGN PATENT DOCUMENTS

| CN | 1050413 | 9/2003 |
| CN | 101701330 | 5/2010 |

(Continued)

OTHER PUBLICATIONS

Bilgin et al., "Optimization of the mechanical properties of Ti-6Al-4V alloy fabricated by selective laser melting using thermohydrogen processes," Jun. 4, 2017, Materials Science & Engineering A, vol. 700, pp. 574-582 (Year: 2017).*

(Continued)

*Primary Examiner* — Ricardo D Morales
(74) *Attorney, Agent, or Firm* — Charney IP Law LLC

(57) ABSTRACT

A method of modifying the physical characteristics of a base titanium alloy article previously manufactured through a selective melting process is disclosed. The method includes introducing hydrogen through a thermohydrogen process to the base titanium alloy article, the resulting titanium alloy article exhibiting an isotropic and fine grained equiaxed microstructure. The thermohydrogen process may include introducing hydrogen into the base titanium alloy article to lower the beta transus temperature, heating the base titanium article above the lowered beta transus temperature to form hydrided beta, lowering the temperature of the base titanium alloy article to affect a eutectoid transformation, and dehydriding the base titanium alloy article via vacuum heating. The base titanium alloy article may have an elevated oxygen content and/or hydrogen may be introduced at 0.4 weight percent or greater.

29 Claims, 8 Drawing Sheets

Related U.S. Application Data

(60) Provisional application No. 62/819,565, filed on Mar. 16, 2019.

(51) Int. Cl.
  *B22F 10/28* (2021.01)
  *B22F 10/64* (2021.01)
  *B33Y 40/20* (2020.01)
  *C22F 1/02* (2006.01)

(52) U.S. Cl.
  CPC .............. *C22F 1/02* (2013.01); *B22F 10/28* (2021.01); *B22F 2301/205* (2013.01); *B22F 2998/10* (2013.01)

(58) Field of Classification Search
  CPC .......... B22F 10/25; B22F 10/28; B22F 10/64; B22F 2201/013; B22F 2301/205; B33Y 40/20
  See application file for complete search history.

(56) References Cited

U.S. PATENT DOCUMENTS

2016/0354976 A1* 12/2016 Zhang .................... B22F 3/1007
2019/0106777 A1*  4/2019 Paramore ................ C22F 1/183

FOREIGN PATENT DOCUMENTS

| CN | 105154701 | | 8/2017 |
| CN | 109554649 | A * | 4/2019 |

OTHER PUBLICATIONS

Hernandez-Nava E. et al., Additive manufacturing titanium components with isotropic or graded properties by hybrid electron beam melting/hot isostatic pressing powder processing. Scientific Reports [online], Mar. 11, 2019 (from international search report).

Ma M. et al., "Phase transformation of titanium hydride in thermal desorption process with different heating rates," International Journal of Hydrogen Energy [online], Jun. 6, 2015 (from international search report).

International Search Report in PCT/US2020/022868 dated Jul. 28, 2020.

Written Opinion of the International Searching Authority in PCT/US2020/022868 dated Jul. 28, 2020.

Extended International Search Report in PCT/US2020/022868 dated Oct. 28, 2022.

The Effect of Thermohydrogen Process on the Mechanical Properties of the Ti-6Al-4V Alloy Produced by Selective Laser Melting, Bilgin, et al., IMMC 2018.

Optimization of the Mechanical Properties of Ti-6Al-4V Alloy Produced by Three Dimensional Additive Manufacturing Using Thermochemical Processes, Bilgin, Middle East Technical University, Jan. 2017.

* cited by examiner

MICROSTRUCTURAL HOMOGENIZATION OF ADDITIVELY MANUFACTURED TITANIUM ARTICLES

CROSS-REFERENCE TO RELATED APPLICATIONS

The present application is a continuation application of PCT Application No. PCT/US2020/022868, filed Mar. 15, 2020, which claims the benefit of U.S. Provisional Patent Application Ser. No. 62/819,565, filed Mar. 16, 2019, and entitled "MICROSTRUCTURAL HOMOGENIZATION OF ADDITIVELY MANUFACTURED TITANIUM ARTICLES," the disclosures of which are hereby incorporated by reference herein.

BACKGROUND OF THE INVENTION

The present disclosure relates to techniques for improving the titanium microstructure of titanium articles. While these techniques may be used to improve titanium articles manufactured by multiple techniques, the disclosure is particularly concerned with homogenizing additively manufactured titanium articles. This includes homogenizing for the purpose of improving performance characteristics.

It is well known that titanium additive manufacturing is inherently a layer-by-layer manufacturing process, and this is reflected in the macro and microstructure of articles fabricated by such methods. Indeed, the direction of build is discernable by build layers and the microstructure has a columnar nature This highly oriented structure is created in selectively melted additive manufacturing processes by the successive melting and solidification of each individual layer as well as each layer's adjacency to the next layers that are subjected to similar thermal cycles. Because the article is built in one direction, it will inherently have different microstructure when viewed "against the direction of build" versus "with the direction of build." Further, the microstructure is highly oriented. This is referred to herein as "anisotropy."

Differences in microstructure causes differences in mechanical properties to the extent that a single material will demonstrate better properties when tested in one direction versus another, for example "against the direction of build" versus "with the direction of build."

This is generally considered to be disadvantageous because these differences must be accounted for in the design and application of articles manufactured by additive manufacturing. This can also lead to a de-rating of the material, limiting the properties to those of the "weakest" direction. It can also cause manufacturing inefficiencies by dictating how the product must be oriented during the build, which could impact the capacity or efficiency of the additive manufacturing operation.

BRIEF SUMMARY OF THE INVENTION

The challenges created by directional building and anisotrophy are encountered in all manifestations of titanium metal additive manufacturing technology that incorporate a melting event to consolidate material. This includes processes using a powder bed fusion approach during which an article is built up by the selective melting of successive layers of titanium powder. The energy source for powder bed fusion is typically a laser or e-beam. Other additive techniques can be generally classified as directed energy techniques. These techniques melt powder or wire delivered to the area where the metal deposit is desired and build up the article layer by layer.

Many titanium alloys can be processed by these additive manufacturing methods, the most common being Ti-6Al-4V. While processing specifics discussed herein are to be understood as relating to this specific alloy, this is not intended to be limiting as the invention will find wide applicability across many titanium alloys.

The common thread throughout these techniques are improved methods and techniques to account for the rapid melting and cooling of a relatively small area of an article being built, referred to herein as "selective melting." In many cases, the entire article is built of material that has seen these thermal cycles. Again, because the article is built directionally, selective melting causes undesirable anisotropy, and associated differences in mechanical properties when tested in different orientations.

The present disclosure provides for the application of thermohydrogen techniques to titanium articles of all manufacture, and in certain instances those specifically manufactured by additive manufacturing methods, for alleviating anisotropy present in the article, effectively homogenizing the titanium microstructure, and overcoming the deleterious effects of oxygen and lamellar microstructures. The present disclosure also relates to the resulting articles upon which thermohydrogen techniques have been applied. These disclosures result in the various invention embodiments described in this and other sections hereof.

Aspect A:

In one Aspect of the invention, referred here as Aspect A, a method of modifying the physical characteristics of a base titanium alloy article previously manufactured through a selective melting process is disclosed. The method of Aspect A comprises introducing hydrogen through a thermohydrogen process to the base titanium alloy article, the resulting titanium alloy article exhibiting an isotropic and fine grained equiaxed microstructure.

In Aspect A, the base titanium alloy article may exhibit more anisotropic and coarser grained qualities than the resulting titanium article.

In Aspect A or any one of the previously mentioned modifications thereto, the resulting titanium alloy article may exhibit an isotropic and fine grained equiaxed microstructure with a grain size below 100 microns.

In Aspect A or any one of the previously mentioned modifications thereto, the resulting titanium alloy article may exhibit an isotropic and fine grained equiaxed microstructure with a grain size below 50 microns.

In Aspect A or any one of the previously mentioned modifications thereto, the resulting titanium alloy article may exhibit an isotropic and fine grained equiaxed microstructure with a grain size below 20 microns.

In Aspect A or any one of the previously mentioned modifications thereto, the resulting titanium alloy article may exhibit an isotropic and fine grained equiaxed microstructure with a grain size below 10 microns.

In Aspect A or any one of the previously mentioned modifications thereto, the step of introducing hydrogen through a thermohydrogen process may include introducing hydrogen into the base titanium alloy article to lower the beta transus temperature; heating the base titanium article above the lowered beta transus temperature to form hydrided beta; lowering the temperature of the base titanium alloy article to affect a eutectoid transformation; dehydriding the base titanium alloy article via vacuum heating.

In Aspect A or any one of the previously mentioned modifications thereto, the temperature resulting from the step of heating the base titanium article above the lowered beta transus temperature to form hydrided beta may be performed in a furnace having a temperature uniformity of any one of +/−28° C. or below, +/−14° C. or below, +/−10° C. or below, +/−8° C. or below, +/−6° C. or below, or +/3° C. or below.

In Aspect A or any one of the previously mentioned modifications thereto, the temperature resulting from the step of dehydriding the base titanium alloy article via vacuum heating may be performed in a furnace having a temperature uniformity of any one of +/−28° C. or below, +/−14° C. or below, +/−10° C. or below, +/−8° C. or below, +/−6° C. or below, or +/3° C. or below.

In Aspect A or any one of the previously mentioned modifications thereto, the step of introducing hydrogen may introduce 0.4 weight percent hydrogen or higher.

In Aspect A or any one of the previously mentioned modifications thereto, the step of introducing hydrogen may introduce 0.5 weight percent hydrogen or higher.

In Aspect A or any one of the previously mentioned modifications thereto, the step of introducing hydrogen may be between 0.5 weight percent hydrogen and 1.5 weight percent hydrogen.

In Aspect A or any one of the previously mentioned modifications thereto, the base titanium alloy article may have an oxygen content above any one of 2000 ppm, 2500 ppm, 3000 ppm, 3500 ppm, and 4000 ppm.

In Aspect A or any one of the previously mentioned modifications thereto, the base titanium alloy article may be a surgical implant.

In Aspect A or any one of the previously mentioned modifications thereto, the base titanium alloy article may be a femoral hip stem.

In Aspect A or any one of the previously mentioned modifications thereto, the resulting titanium alloy article may exhibit a fatigue performance equivalent or better than wrought material of the same titanium alloy.

In Aspect A or any one of the previously mentioned modifications thereto, the base titanium alloy article may be manufactured by a first entity and the step of introducing hydrogen through a thermohydrogen process may be conducted by a second entity.

In Aspect A or any one of the previously mentioned modifications thereto, the base titanium alloy article may be manufactured at a first facility and the step of introducing hydrogen through a thermohydrogen process may be conducted at a separate facility remote from the first facility.

Aspect A or any one of the previously mentioned modifications thereto may further comprise hot isostatic pressing of the base article or the resulting article.

Aspect A or any one of the previously mentioned modifications thereto may further comprise hot isostatic pressing the base article prior to the step of introducing hydrogen.

Aspect B:

In another Aspect of the invention, referred here as Aspect B, a method of processing a selectively melted titanium article is disclosed. The method of Aspect B comprises introducing hydrogen into the article to lower the beta transus temperature of the article; heating the article above the lowered beta transus temperature to form hydrided beta; lowering temperature of the article to below the eutectoid transformation point; and dehydriding the article via vacuum heating to result in a processed article.

In Aspect B, the step of heating the article above the lowered beta transus temperature to form hydrided beta phase may be performed in a furnace having a temperature uniformity of any one of +/−28° C. or below, +/−14° C. or below, +/−10° C. or below, +/−8° C. or below, +/−6° C. or below, or +/3° C. or below.

In Aspect B or any one of the previously mentioned modifications thereto, the step of dehydriding the article via vacuum heating to result in a processed article may be performed in a furnace having a temperature uniformity of any one of +/−28° C. or below, +/−14° C. or below, +/−10° C. or below, +/−8° C. or below, +/−6° C. or below, or +/3° C. or below.

In Aspect B or any one of the previously mentioned modifications thereto, the grain size of the processed article may be smaller than the grain size of the unprocessed article.

In Aspect B or any one of the previously mentioned modifications thereto, the grain size of the processed article may be below 100 microns.

In Aspect B or any one of the previously mentioned modifications thereto, the grain size of the processed article may be below 50 microns.

In Aspect B or any one of the previously mentioned modifications thereto, the grain size of the processed article may be below 20 microns.

In Aspect B or any one of the previously mentioned modifications thereto, the grain size of the processed article may be below 10 microns.

Aspect B or any one of the previously mentioned modifications thereto may further comprise hot isostatic pressing of the article or the processed article.

Aspect B or any one of the previously mentioned modifications thereto may further comprise hot isostatic pressing the article prior to the step of introducing hydrogen.

Aspect B or any one of the previously mentioned modification may further comprise annealing the article prior to the step of introducing hydrogen.

In Aspect B or any one of the previously mentioned modifications thereto, the step of introducing hydrogen may introduce 0.4 weight percent hydrogen or higher.

In Aspect B or any one of the previously mentioned modifications thereto, the step of introducing hydrogen may introduce 0.5 weight percent hydrogen or higher.

In Aspect B or any one of the previously mentioned modifications thereto, the step of introducing hydrogen may introduce between 0.5 to 1.5 weight percent hydrogen.

In Aspect B or any one of the previously mentioned modifications thereto, the article may be heated 10° C. to 75° C. above the transus temperature during the step of heating the article above the lowered beta transus temperature to form a hydrided beta phase.

In Aspect B or any one of the previously mentioned modifications thereto, the temperature resulting from the step of heating the article above the lowered beta transus temperature to form a hydrided beta phase may be maintained for 30 to 60 minutes.

In Aspect B or any one of the previously mentioned modifications thereto, the temperature resulting from the step of lowering the temperature of the article to below the eutectoid transformation point may be held from between 3 to 6 hours.

In Aspect B or any one of the previously mentioned modifications thereto, the step of dehydriding the article via vacuum heating to result in a processed article may be conducted between 650° C. and 850° C. for 2 to 48 hours.

In Aspect B or any one of the previously mentioned modifications thereto, the step of introducing hydrogen may introduce between 0.5 to 1.5 weight percent hydrogen; the article may be heated 10° C. to 75° C. above the transus temperature during the step of heating the article above the lowered beta transus temperature to form a hydrided beta phase; the temperature resulting from the step of heating the article above the lowered beta transus temperature to form a hydrided beta phase may be maintained for 30 to 60 minutes; the temperature resulting from the step of lowering the temperature of the article to below the eutectoid transformation point may be held from between 3 to 6 hours; and, the step of dehydriding the article via vacuum heating to result in a processed article may be conducted between 650° C. and 850° C. for 2 to 48 hours.

In Aspect B or any one of the previously mentioned modifications thereto, the oxygen content of the article may be above any one of 1300 ppm, 1500 ppm, 2000 ppm, 2500 ppm, 3000 ppm, 3500 ppm, or 4000 ppm.

In Aspect B or any one of the previously mentioned modifications thereto, the article may be a surgical implant.

In Aspect B or any one of the previously mentioned modifications thereto, the article may be a femoral hip stem.

In Aspect B or any one of the previously mentioned modifications thereto, the processed article may exhibit a fatigue performance equivalent or better than wrought material of the same titanium alloy.

Aspect C:

In another Aspect of the invention, referred here as Aspect C, a titanium alloy article of manufacture comprises an oxygen content greater than 2000 ppm; a fine grained equiaxed microstructure; and, a grain size below 100 microns.

In Aspect C or any one of the previously mentioned modifications thereto, the article may comprise an isotropic microstructure.

In Aspect C or any one of the previously mentioned modifications thereto, the grain size may be below 50 microns.

In Aspect C or any one of the previously mentioned modifications thereto, the grain size may be below 20 microns.

In Aspect C or any one of the previously mentioned modifications thereto, the grain size may be below 10 microns.

In Aspect C or any one of the previously mentioned modifications thereto, the fine grained equiaxed microstructure may be a consequence of thermohydrogen treatment.

In Aspect C or any one of the previously mentioned modifications thereto, the oxygen content may be greater than 2500 ppm, 3000 ppm, 3500 ppm, or 4000 ppm.

In Aspect C or any one of the previously mentioned modifications thereto, the article may be a surgical implant.

In Aspect C or any one of the previously mentioned modifications thereto, the article may be a femoral hip stem.

In Aspect C or any one of the previously mentioned modifications thereto, the article may exhibit a fatigue performance equivalent or better than wrought material of the same titanium alloy.

In Aspect C or any one of the previously mentioned modifications thereto, the article may be a high strength titanium article.

Aspect D:

In another Aspect of the invention, referred here as Aspect D, a method of modifying the physical characteristics of a base titanium alloy article having an elevated oxygen content is disclosed. The method of Aspect D comprises introducing at least 0.4 weight percent hydrogen to the base titanium alloy article to lower the beta transus temperature, heating the article to above the lowered beta transus temperature to form hydrided beta, lowering the temperature of the article to affect a eutectoid transformation, dehydriding the article via vacuum heating to create a resulting article; the resulting article exhibiting a fine grained equiaxed microstructure with a grain size below 100 microns; wherein the elevated oxygen content is above 2000 ppm.

In Aspect D or any one of the previously mentioned modifications thereto, the resulting article may exhibit an isotropic microstructure.

In Aspect D or any one of the previously mentioned modifications thereto, the resulting article exhibits a fine grained equiaxed microstructure with a grain size below 50 microns.

In Aspect D or any one of the previously mentioned modifications thereto, the resulting article may exhibit a fine grained equiaxed microstructure with a grain size below 20 microns.

In Aspect D or any one of the previously mentioned modifications thereto, the resulting article may exhibit a fine grained equiaxed microstructure with a grain size below 10 microns.

In Aspect D or any one of the previously mentioned modifications thereto, the step of heating the article to above the lowered beta transus temperature may be performed in a furnace having a temperature uniformity of any one of +/−28° C. or below, +/−14° C. or below, +/−10° C. or below, +/−8° C. or below, +/−6° C. or below, or +/3° C. or below.

In Aspect D or any one of the previously mentioned modifications thereto, the step of dehydriding the article via vacuum heating may be performed in a furnace having a temperature uniformity of any one of +/−28° C. or below, +/−14° C. or below, +/−10° C. or below, +/−8° C. or below, +/−6° C. or below, or +/3° C. or below.

In Aspect D or any one of the previously mentioned modifications thereto, the step of introducing hydrogen may be at least 0.5 weight percent hydrogen.

In Aspect D or any one of the previously mentioned modifications thereto, the step of introducing hydrogen may be between 0.5 weight percent hydrogen and 1.5 weight percent hydrogen.

In Aspect D, the step of heating the article to above the lowered beta transus temperature may be performed in a furnace having a temperature uniformity of any one of +/−28° C. or below, +/−14° C. or below, +/−10° C. or below, +/−8° C. or below, +/−6° C. or below, or +/3° C. or below; the step of dehydriding the article via vacuum heating may be performed in a furnace having a temperature uniformity of any one of +/−28° C. or below, +/−14° C. or below, +/−10° C. or below, +/−8° C. or below, +/−6° C. or below, or +/3° C. or below; and, the step of introducing hydrogen may be between 0.5 weight percent hydrogen and 1.5 weight percent hydrogen.

In Aspect D or any one of the previously mentioned modifications thereto, the elevated oxygen content may be above any one of 2500 ppm, 3000 ppm, 3500 ppm, and 4000 ppm.

In Aspect D or any one of the previously mentioned modifications thereto, the titanium alloy article may be a surgical implant.

In Aspect D or any one of the previously mentioned modifications thereto, the titanium alloy article may be a femoral hip stem.

In Aspect D or any one of the previously mentioned modifications thereto, the titanium alloy article may exhibit a fatigue performance equivalent or better than wrought material of the same titanium alloy.

In Aspect D or any one of the previously mentioned modifications thereto, the titanium alloy article may be a high strength titanium alloy article.

Aspect E:

In another Aspect of the invention, referred here as Aspect E, a method of modifying the physical characteristics of a titanium alloy article is disclosed. The method of Aspect E comprises introducing at least 0.4 weight percent hydrogen to a titanium alloy article to lower the beta transus temperature; heating the article to a temperature above the lowered beta transus temperature to form hydrided beta, the heating being performed in a furnace having a temperature uniformity of +/−28° C. or below; lowering the temperature of the article to affect a eutectoid transformation; dehydriding the article via vacuum heating to form a resulting article; wherein the resulting article exhibits a fine grained equiaxed microstructure with a grain size below 100 microns.

In Aspect E or any one of the previously mentioned modifications thereto, the step of introducing hydrogen to a titanium alloy article to lower the beta transus temperature may introduce at least 0.5 weight percent hydrogen.

In Aspect E or any one of the previously mentioned modifications thereto, the step of introducing hydrogen to a titanium alloy article to lower the beta transus temperature may introduce between 0.5 weight percent hydrogen and 1.5 weight percent hydrogen.

In Aspect E or any one of the previously mentioned modifications thereto, the resulting article exhibits an isotropic microstructure.

In Aspect E or any one of the previously mentioned modifications thereto, the resulting article may exhibit a fine grained equiaxed microstructure with a grain size below 50 microns.

In Aspect E or any one of the previously mentioned modifications thereto, the resulting article may exhibit a fine grained equiaxed microstructure with a grain size below 20 microns.

In Aspect E or any one of the previously mentioned modifications thereto, the resulting article may exhibit a fine grained equiaxed microstructure with a grain size below 10 microns.

In Aspect E or any one of the previously mentioned modifications thereto, the titanium alloy article may have an oxygen content of above 2000 ppm.

In Aspect E or any one of the previously mentioned modifications thereto, the titanium alloy article may have an oxygen content of above 3000 ppm.

In Aspect E or any one of the previously mentioned modifications thereto, the step of heating the article to a temperature above the lowered beta transus temperature to form hydrided beta may be performed in a furnace having a temperature uniformity of any one of +/−14° C. or below, +/−10° C. or below, +/−8° C. or below, +/−6° C. or below, or +/3° C. or below.

In Aspect E or any one of the previously mentioned modifications thereto, the step of dehydriding the article via vacuum heating may be performed in a furnace having a temperature uniformity of any one of +/−28° C. or below, +/−14° C. or below, +/−10° C. or below, +/−8° C. or below, +/−6° C. or below, or +/3° C. or below.

In Aspect E or any one of the previously mentioned modifications thereto, the resulting article may exhibit a fatigue performance equivalent or better than wrought material of the same titanium alloy.

In Aspect E or any one of the previously mentioned modifications thereto, the resulting article may be a surgical implant.

In Aspect E or any one of the previously mentioned modifications thereto, the resulting article may be a femoral hip stem.

Aspect F:

In another Aspect of the invention, referred here as Aspect F, a method of modifying the physical characteristics of a titanium alloy article is disclosed. The method of Aspect F comprises introducing at least 0.4 weight percent hydrogen to a titanium alloy article to lower the beta transus temperature; heating the article to a temperature above the lowered beta transus temperature to form hydrided beta; lowering the temperature of the article to affect a eutectoid transformation; dehydriding the article via vacuum heating to form a resulting article, the vacuum heating being performed in a furnace having a temperature uniformity of +/−28° C. or below; wherein the resulting article exhibits a fine grained equiaxed microstructure with a grain size below 100 microns.

In Aspect F or any one of the previously mentioned modifications thereto, the step of introducing hydrogen to a titanium alloy article to lower the beta transus temperature may introduce at least 0.5 weight percent hydrogen.

In Aspect F or any one of the previously mentioned modifications thereto, the step of introducing hydrogen to a titanium alloy article to lower the beta transus temperature may introduce between 0.5 weight percent hydrogen and 1.5 weight percent hydrogen.

In Aspect F or any one of the previously mentioned modifications thereto, the resulting article may exhibit an isotropic microstructure.

In Aspect F or any one of the previously mentioned modifications thereto, the resulting article may exhibit a fine grained equiaxed microstructure with a grain size below 50 microns.

In Aspect F or any one of the previously mentioned modifications thereto, the resulting article may exhibit a fine grained equiaxed microstructure with a grain size below 20 microns.

In Aspect F or any one of the previously mentioned modifications thereto, the resulting article may exhibit a fine grained equiaxed microstructure with a grain size below 10 microns.

In Aspect F or any one of the previously mentioned modifications thereto, the titanium alloy article may have an oxygen content of above 2000 ppm.

In Aspect F or any one of the previously mentioned modifications thereto, the titanium alloy article may have an oxygen content of above 3000 ppm.

In Aspect F or any one of the previously mentioned modifications thereto, the step of heating the article to a temperature above the lowered beta transus temperature to form hydrided beta may be performed in a furnace having a temperature uniformity of any one of +/−28° C. or below, +/−14° C. or below, +/−10° C. or below, +/−8° C. or below, +/−6° C. or below, or +/3° C. or below.

In Aspect F or any one of the previously mentioned modifications thereto, the step of dehydriding the article via vacuum heating may be performed in a furnace having a temperature uniformity of any one of +/−14° C. or below, +/−10° C. or below, +/−8° C. or below, +/−6° C. or below, or +/3° C. or below.

In Aspect F or any one of the previously mentioned modifications thereto, the resulting article may exhibit a fatigue performance equivalent or better than wrought material of the same titanium alloy.

In Aspect F or any one of the previously mentioned modifications thereto, the resulting article may be a surgical implant.

In Aspect F or any one of the previously mentioned modifications thereto, the resulting article may be a femoral hip stem.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, will be or become apparent to one with skill in the art upon reference to the following detailed description when read with the accompanying drawings. It is intended that any additional organizations, methods of operation, features, objects or advantages ascertained by one skilled in the art be included within this description, be within the scope of the present invention, and be protected by the accompanying claims.

With respect to the drawings.

DETAILED DESCRIPTION

Figure 1:
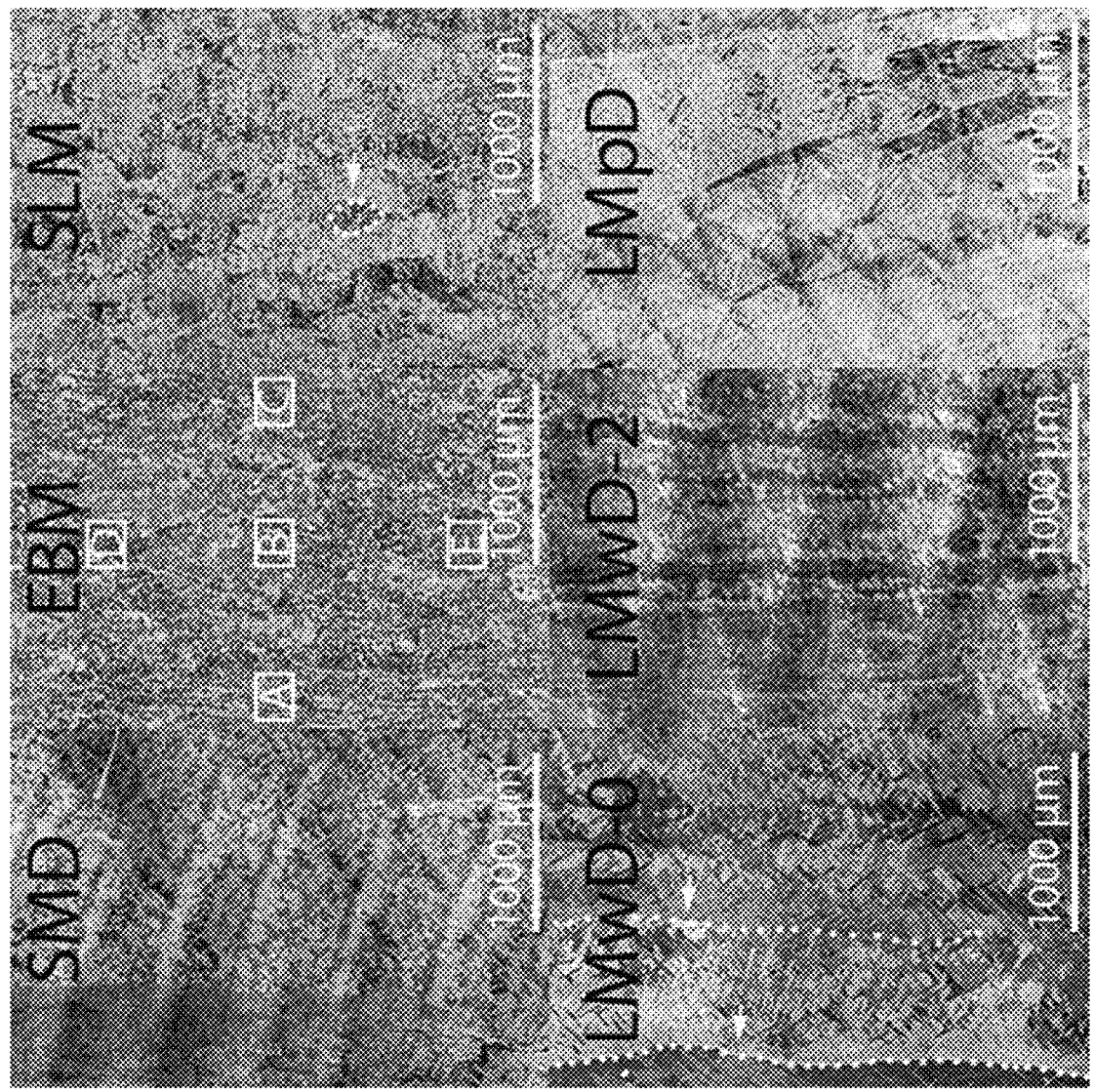
FIG. 1 depicts a comparison of macrostructures resulting from different additive manufacturing techniques.

In the following are described the preferred embodiments of MICROSTRUCTURAL IMPROVEMENTS OF TITANIUM ALLOYS in accordance with the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

The phrase "selective melting" has and will be used throughout this disclosure. For clarity, it is to be understood that in using the phrase "selective melting," it is intended that all additive manufacturing technologies incorporating a melting event be included. The term "additively manufactured" shall be construed more broadly to include all additively manufactured articles, including those that are and are not selectively melted.

As previously discussed, additively manufactured titanium articles exhibit anisotropy causing differences in mechanical properties when tested in different orientations. The challenges of anisotropy are well understood in the industry. To alleviate these challenges, it is known that the microstructure may be moderately improved using conventional processes such as hot isostatic pressing (HIP) or annealing. It is also well known that these processes these have their own inherent limitations, some of which are discussed below.

Titanium is often used in medical or aerospace applications where fatigue performance is critical. Yet selectively melted articles often exhibit residual porosity which is detrimental to fatigue performance, and is regarded as un-acceptable in medical or aerospace applications. To remove this residual porosity, it is known to HIP the article. However, the thermal cycle associated with the HIPing process can negatively impact the microstructure due to the extended time the article must spend at elevated temperature.

The thermal cycle associated with HIPing will increase the grain size and develop a coarser elongated alpha structure. This structure change is generally good for improving ductility but is understood to reduce the tensile strength. This reduction of tensile strength is particularly undesirable from a fatigue strength perspective. In any event, the anisotropy persists after HIPing and the parts still exhibit columnar grain structure.

A challenge exists in creating pore free articles that retain a high tensile strength and a microstructure suitable for delivering good fatigue performance. The techniques of the present invention develop microstructures that are truly unique in the world of selectively melted titanium.

The nature of these microstructures are dependent on a host of variables that depend on the specific process parameters, the specific article geometry, and the specific consolidation technique being used. There are many process variables, among them deposition rate, scanning speed of the energy source, and intensity of the energy source. The product can have sections of varying thickness which in turn create hot spots or heat sinks, altering the thermal conditions seen in different sections of the same part. Different techniques use different energy sources, raw material, and deposition methods, all of which impact the microstructure. It is important to note that the microstructure changes not only between different process settings or fabricating technologies, but may also vary significantly within a single article.

There are many different techniques for additively manufacturing titanium metal articles via selective melting, including Direct Metal Laser Sintering (DMLS), Electron Beam Melting (EBM), Laser Engineered Net Shaping (LENS), Laser Metal Powder Deposition (LMpD), Laser Metal Wire Deposition (LMwD), Shaped Metal Deposition (SMD), Sintering Laser Sintering (SLS) and Selective Laser Melting (SLM).

Low magnification metallographic images, such as those of FIG. 1, are sometimes referred to as macrostructures. Macrostructures are particularly useful for observing large scale orientation. FIG. 1 shows macrostructure from several different additive manufacturing techniques, namely Shaped Metal Deposition (SMD), Electron Beam Additive Manufacturing (EBM), Selective Laser Melting (SLM), Continuous Laser Metal Wire Deposition (LMwD-0), Laser Metal Wire deposition with two-minute intervals (LMwD-2), and Laser Metal Powder Deposition (LMpD). While the specific nature of the microstructures varies between images, they all share layer like or highly oriented structures.

As can be observed in the FIG. 1 comparison, many differing microstructures are also encountered. They can be varied from large columnar grains, small columnar grains, equiaxed grains, and blends of these types. Biasing the microstructure towards completely equiaxed has been demonstrated to be difficult in practice because manipulation of the process parameters toward an equiaxed microstructure means trading other attributes of the finished article such as tensile strength, ductility, and layer adhesion.

The degree of equiaxed versus columnar structure can be manipulated by changing process parameters such as deposition rate, scanning speed, and energy level, but this comes at a cost of other material properties, or commercial considerations such as build time.

Substantial development effort is applied to overcoming these challenges and controlling the variables to create a relatively predictable microstructure. However, in practice it is difficult to achieve microstructures that are both predictable and desirable, and it is impossible to create microstructures that are ideal.

It is therefore desirable to provide a method of homogenizing these microstructures within a single article to provide a consistent microstructure across the article, while providing equivalent or superior mechanical properties to the original. A secondary heat treatment that could simultaneously homogenize and improve the microstructure would find wide usefulness in expanding the adoption of selectively melted titanium articles to more demanding applications.

Because of the extreme thermal stresses imparted to the article due the many melting, cooling, and re-melting cycles that happen during fabrication, it is conventionally considered necessary to anneal the parts prior to putting them into service, or even removing them from the build platform. In practice, bench cracking can sometime occur before the parts are annealed.

In this way, and quite conventionally, microstructure can also be homogenized with thermal cycles such as through vacuum or inert atmosphere annealing. Typical low temperature annealing conditions in the 500-650° C. range will not eliminate the columnar structure but will relieve some of the stress associated with fabrication. High temperature anneals, typically around 800° C., will more substantially modify the microstructure, coarsening the grain size, and developing a somewhat less elongated alpha structure, but without eliminating the macro columnar structure.

The grain coarsening associated with annealing along with the retained high aspect ratio alpha grains will have a negative effect on mechanical properties. Like the changes seen during a HIP cycle, the growth of elongated alpha structure slightly improves elongation bu: has the deleterious effect of reducing tensile properties. Further, the larger grain size and elongated alpha structure is understood to negatively impact fatigue performance.

What is desired is a method of eliminating anisotropic mechanical properties while not diminishing, and preferably improving, the mechanical performance of the material over the original.

What is also desired is a method of homogenizing the microstructure across a part, build, or process.

What is further desired is a porosity-free article having a homogenous, isotropic, and refined microstructure.

From a purchasing perspective it would also be desirable for buyers to be able to purchase articles from multiple additive manufacturing vendors and subsequently have the ability to treat the parts to ensure consistent properties. In other words, the processes disclosed herein may be applied well after an additively manufactured article is completed, including after the article is shipped to an entity other than the manufacturer. For example, a base titanium article may be manufactured by a first entity while the later steps of introducing hydrogen through a thermohydrogen process is conducted by a second entity. Additionally, a base titanium article may be manufactured at a first facility while the later steps of introducing hydrogen through a thermohydrogen process are conducted at a second facility remote from the first, either by the same entity or a separate entity.

Thermohydrogen treatment is a well understood process used to refine the grain size of titanium articles manufactured by means other than additive manufacturing, such as cast and powder metallurgy. Using thermohydrogen treatment, grain size refinement is improved by incorporating hydrogen as a temporary alloying element during thermal treatment. This disclosure and the inventions defined herein demonstrate that thermohydrogen treatment may also be successfully applied to titanium articles additively manufactured via selective melting techniques, to not only refine grain size, but to eliminate isotropic microstructures without diminishing the mechanical properties.

Prior application of these technologies has focused on refinement of the microstructure, but not mitigation or elimination of large-scale orientation, columnar microstructure, or anisotropic microstructure. As described, selectively melted microstructures are unique and can vary tremendously across individual parts, batches, or processes. Given the novelty and marked differences with conventionally manufactured titanium parts, it was not clear to practitioners in this area prior to this disclosure that thermohydrogen treatment techniques would be applicable to the microstructural challenges of additive manufactured titanium parts.

Indeed, because additive manufacturing is a relatively new technique, the resulting microstructures are not well understood, nor are their reactions to different post manufacturing processes. The microstructures are also proving to be unpredictable. The microstructures are subject to many variables that change between machine types, specific geometries, and the specific process settings. It is challenging to predict exactly what characteristics of microstructure will be produced and how consistent those microstructures will be across the article, let alone how the microstructures will respond to thermal treatment after the article is additively manufactured.

Thermohydrogen treatment has many variations and goes by many different names, among them Thermo-hydrogen processing (THP) and Thermohydrogen treatment (THT). No matter the name, they all include the general steps of introducing hydrogen into the article to manipulate the microstructure and then removing the hydrogen. The manipulation of microstructure occurs as a result of the hydrogen and temperature changes, and this discussion in not intended to included processes that include mechanical deformation to change the microstructure. A typical cycle would include the general steps of introducing hydrogen into the article to manipulate the microstructure and then removing the hydrogen to lower the beta transus temperature, heating the article above this new lowered beta transus temperature to form hydrided beta, lowering the temperature of the article to affect a eutectoid transformation, and then dehydriding the article via vacuum heating.

Technically a minimum of 0.4 weight percent hydrogen is needed to complete depression of the beta transus. In practice the introduction of hydrogen is typically 0.5 weight percent hydrogen or higher. Additions of hydrogen above 0.5 weight percent do not further depress the transus. Additions substantially higher than 1.5 weight percent can cause cracking of the article.

Once the article is hydrided the temperature is elevated above the new transus. While there is no understood minimum temperature increase above the transus, in practice the article is heated 10° C. to 75° C. above the transus to ensure that the requirement of exceeding the transus is met. It is understood that it is important that the article be heated above the transus to allow for the fullest development of the hydrided beta phase. This is also referred to as the beta solutionizing step. The kinetics of this are relatively fast and the time above the transus is not understood to be especially critical. In practice, the temperature is maintained for 30 to 60 minutes. Further, if very slow ramp rates are used it may not be necessary for a discrete hold.

Afterwards, the article is lowered in temperature to transform the eutectoid. Because the kinetics here are relatively slow, the cooling rate is not critical, but is understood to be in the range of 3-15° C./min. Because of the lower temperature the kinetics are slower, and these holds can range from 0 to 6 hours in length, but are more typically 2 to 4 hours in length. In practice a slow cool down through the decomposition window can provide an effective eutectoid decomposition.

The article is then heated in a vacuum to remove the hydrogen. Time and temperature for optimized vacuum removal of hydrogen depend upon the thickness of the part, with thicker parts requiring higher temperature and/or longer heated vacuum times. Typical dehydride conditions are between 650° C. and 850° C. for 2 to 48 hours. Preferred dehydride temperatures are between 700° C. and 800° C. It has been reported that cross-sections of up to 1 inch can be processed in this manner.

As discussed above, thermohydrogen treatment has been demonstrated to refine the grain size of titanium microstructures formed from non-additively manufactured methods. Incorporating similar methodologies in titanium parts additively manufactured using selectively melting, and starting with columnar grains having a major length of over 500 microns, it has been shown that an article may display a finished grain size below 50 microns.

It has also been shown that an article may display a finished grain size below 20 microns. Finished articles may also display a finished grain size below 10 microns. Investigations of the present inventors have shown that these techniques also eliminate anisotropic microstructure previously introduced during the layer by layer construction of the article. Thus, the articles display an isotropic and fine grained equiaxed microstructure, including those of below 50 microns, below 20 microns, and below 10 microns. One of the challenges of selective melting is that while the frequency of pores is lesser than that of other powder technologies, the pores are less predictable and less controllable. To ensure the absence of detrimental levels of porosity, the components may be HIPed.

Thus, additively manufactured titanium parts are often HIPed to eliminate residual porosity. Typical HIP treatment for titanium is heating to approximately 900° C. and 100 MPa for 2 hours. This is the most common cycle for HIPing titanium and it should be apparent to those skilled in the art that adjusting the temperature and or the pressure could yield improvements in microstructure. Specifically, lower temperatures could yield better microstructure but could require higher pressure.

A further advantage of the invention is that thermohydrogen treatment can be used to homogenize and refine the microstructure of HIPed components to present a fully dense article with a homogenous macro and microstructure and a refined grain size. While occasional microscopic porosity may remain, the term "fully dense" is understood to mean and article has been successfully HIPed, having a density of 99.5% or greater.

Example 1—the Following is an Exemplary Procedure in Accordance with the Present Invention An additively manufactured Ti-6Al-4V article was first annealed at 590° C. for 1 hour to relieve stresses induced during the additive manufacturing process. The article was then subjected to thermohydrogen treatment by hydriding the component to a hydrogen content of 0.65 weight percent at 785° C. The hydrogen is a beta stabilizer and lowers the transus temperature to approximately 800° C. Because of this, the article can be beta solutionized at temperatures lower that the transus of the original, un-hydrided alloy. It should also be understood that while 785° C. was used in this example, hydriding could occur at a wide range of temperatures including between 740° C. and 790° C. These temperatures are understood to be in an environment that is mostly hydrogen. Partial pressures of hydrogen and blended atmosphere can be used to manipulate these temperatures.

In this example the article was beta solutionized in hydrogen at 825° C. for 1 hour. It should also be understood that while 825° C. was used in this example beta solutionization can occur at a wide range of temperatures including between 815° C. and 875° C. Afterward it was held for 6 hours at 580° C. in argon to affect a eutectoid transformation. Following this step, the hydrogen was removed via vacuum heating at 700° C. until the hydrogen was removed. It should also be understood that while 700° C. was used in this example, dehydriding can occur at a wide range of temperature including between 670° C. and 750° C.

Figure 2:
FIG. 2 depicts selectively melted Ti-6Al-4V material exhibiting anisotropic vertical grain orientation.

FIG. 2 shows the additively manufactured article prior to hydrogen heat treatment. As can clearly been seen, the microstructure exhibits strong directionality. This is due to the layered fabrication technique. It is also noted that this material was stress relieved prior to being removed from the build platform by heating at 590° C. for 1 hr.

Figure 3:
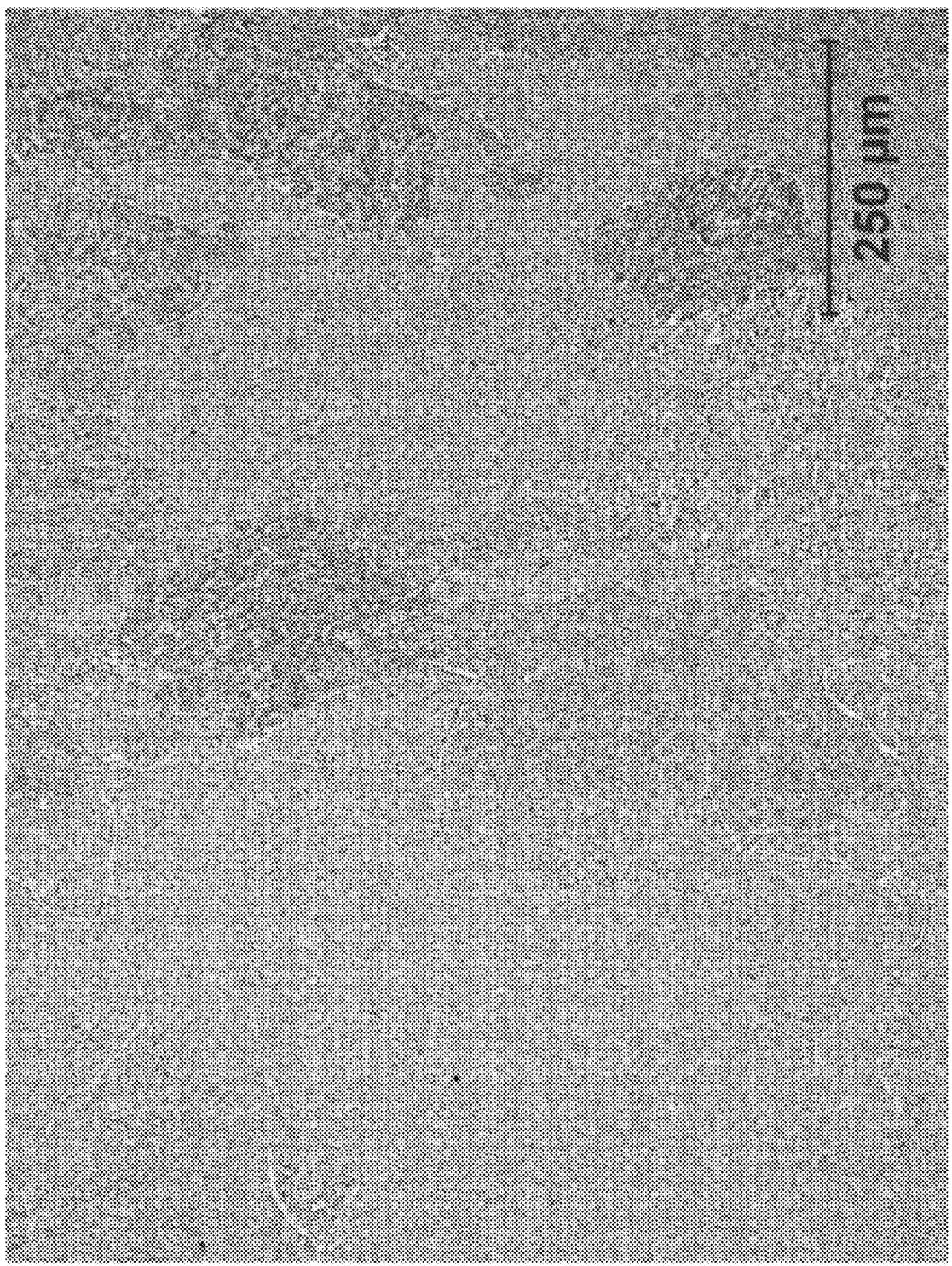
FIG. 3 depicts the selectively melted Ti-6Al-4V material of FIG. 2 following thermohydrogen treatment.

FIG. 3 shows the same article as FIG. 2 following treatment using the thermohydrogen techniques of the present invention. It is clear from a comparison of the Figures that microstructure directionality has been eliminated. While some prior grain boundaries are visible, comparisons of the mechanical properties of the initial material and the treated material indicate that in addition to homogenization of the microstructures, the mechanical properties have not been diminished, and in fact have improved. Grain size has been substantially reduced from in excess of 100 microns to below 10 microns.

TABLE 1

Comparison of Tensile Properties

| CONDITION | UTS (ksi) | Y.S. (ksi) | Elong (%) |
|---|---|---|---|
| Typical specification minimum | 130 | 120 | 10 |
| Selectively melted with stress relief anneal (FIG. 7) | 190 | 173 | 4 |
| After Thermohydrogen treatment (FIG. 8) | 150 | 139 | 12 |

Table 1 compares the mechanical properties of selectively melted Ti-6A-4V and the same material after thermohydrogen treatment, including ultimate tensile strength (UTS), yield strength (Y.S.), and elongation, while also providing a conventional material specification.

The untreated selectively melted component exhibits very high tensile strength (190 ksi) but is very brittle with an elongation of only 4%. The specified minimum elongation for this alloy in most industry specifications is 10%. While the tensile strength is above the typical specification minimum of 130 ksi, the material is unacceptably brittle when compared with the industry standards for Ti-6Al-4V.

There are many specifications for the Ti-6Al-4V alloy, and they vary slightly between industries and manufacturing methods. The values shown in Table 1 are representative of most specifications. The selectively melted parts would not meet the specification and would not be useful in demanding applications.

These parts were then subjected to thermohydrogen treatment and have been proven to show very good tensile values, albeit slightly lower than before, when compared to the typical specification limits while also now meeting the elongation requirement. The treatment has homogenized the microstructure and eliminated anisotropy, while balancing the mechanical properties to provide a strong yet ductile product. In this regard, because the material still meets the specification, some reduction of the ultimate tensile strength is acceptable given the accompanying improvement in elongation.

Discussion of HIPing:

If desired due to the end use of the material hot isostatic pressing can be employed to remove residual porosity. HIPing of Ti-6Al-4V is typically performed by heating the part for 2 hrs at 900° C. while simultaneously subjecting it to 100 MPa of pressure via an inert gas. Because of the proximity to the beta transus and the extended temperature, the grains will coarsen during this operation, and during coarsening, plates and laths will grow. This high aspect ratio element of the microstructure is understood to be detrimental to figure performance. Also, tensile properties will typically decrease and there will be an increase in elongation.

It is a problem that in order to eliminate porosity, which is determinate to fatigue, one must subject the part to thermal conditions that in turn affect microstructural changes that are detrimental to fatigue. The employment of a thermohydrogen technique after a HIPing cycle can not only homogenize the microstructure to eliminate anisotropy, but can refine the microstructure, breaking up the plate-like structure and providing better fatigue performance.

Figure 4:
FIG. 4 depicts selectively melted Ti-6Al-4V material annealed at 800° C. for 1 hour.

FIG. 4 shows selectively melted Ti-6Al-4V at a scale of 250 μm that had been annealed at 800° C. For comparison, FIG. 5 shows the same selectively melted and annealed Ti-6Al-4V after HIPing at 900° C.

FIG. 4 exhibits a highly columnar structure with relatively fine grains inside of the columns. Because of the higher temperature anneal, this structure has more developed alpha grains than the microstructure in FIG. 2. It is still likely to have residual porosity because it has not been HIPed.

Figure 5:
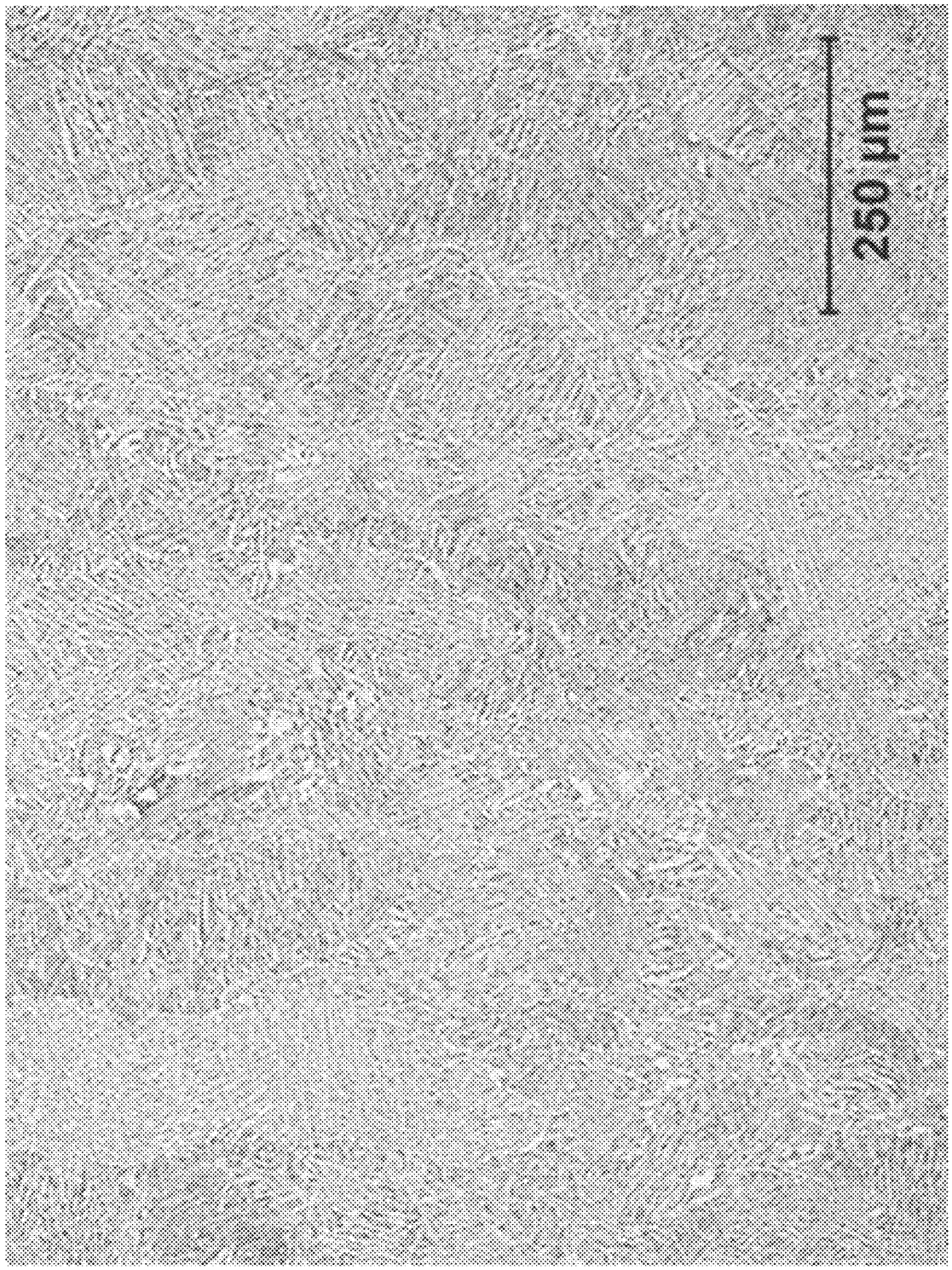
FIG. 5 depicts selectively melted Ti-6Al-4V material first annealed at 800° C. for 1 hour and then HIPed at 900° C. for 2 hours.

The annealed and HIPed material of FIG. 5 exhibits coarsened grains that will diminish the tensile strength and fatigue performance. Also, the oriented, anisotropic columnar structure is still evident.

Figure 6:
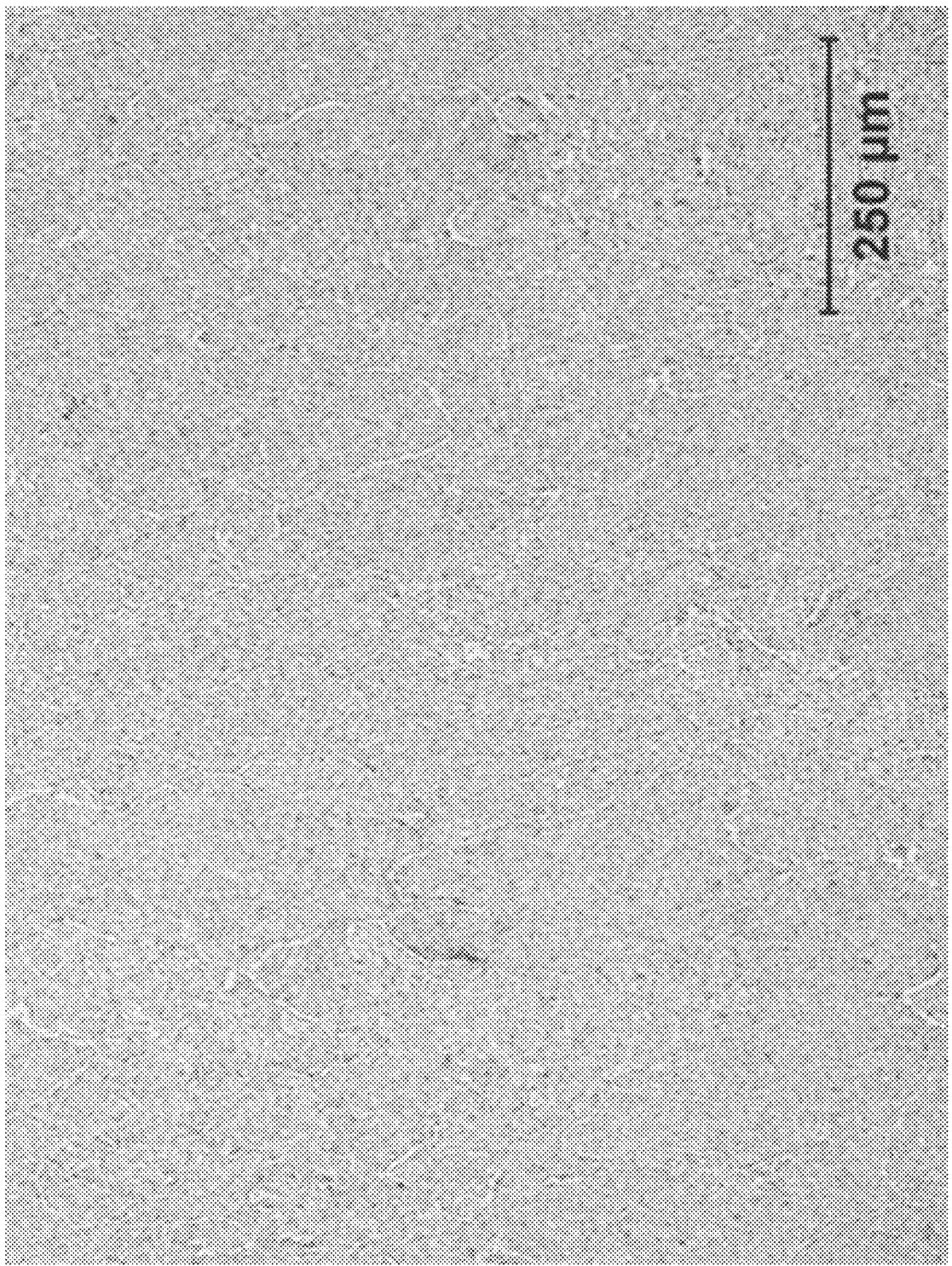
FIG. 6 depicts selectively melted Ti-6Al-4V material first annealed at 800° C. for 1 hour, HIPed at 900° C. for 2 hours, and then subjected to thermohydrogen treatment.

FIG. 6 shows the same material as FIG. 5 after thermohydrogen treatment. It will be appreciated that the anisotropic structure has been eliminated, and that average grain size is well below 50 microns.

Figure 7:
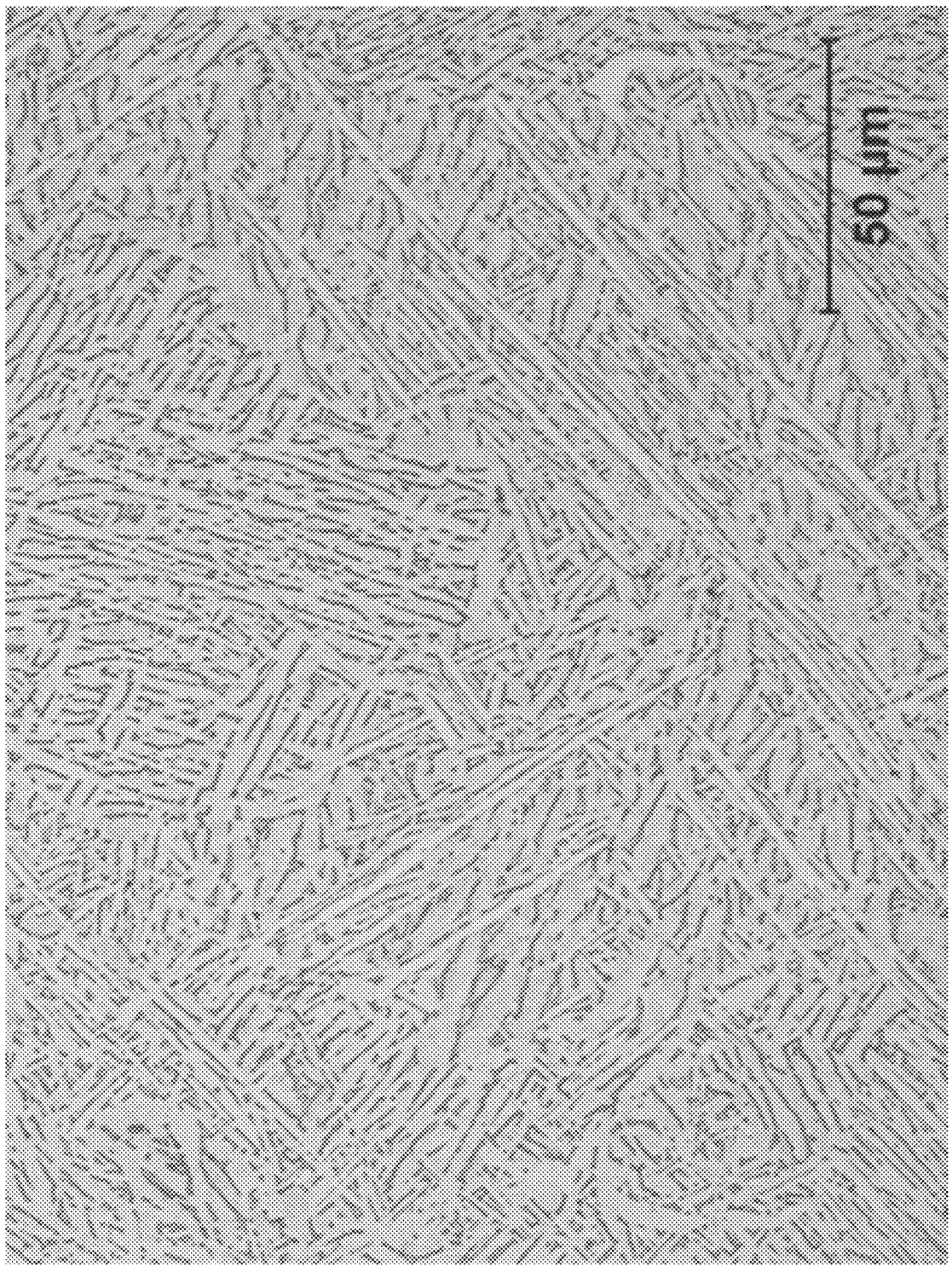
FIG. 7 is a higher magnification view of the material of FIG. 5.

FIG. 7 depicts a higher magnification image of the annealed and HIPed structure of FIG. 5. While the grains are relatively small, many elongated plate-like elements are present. These are known to be detrimental to fatigue performance.

Figure 8:
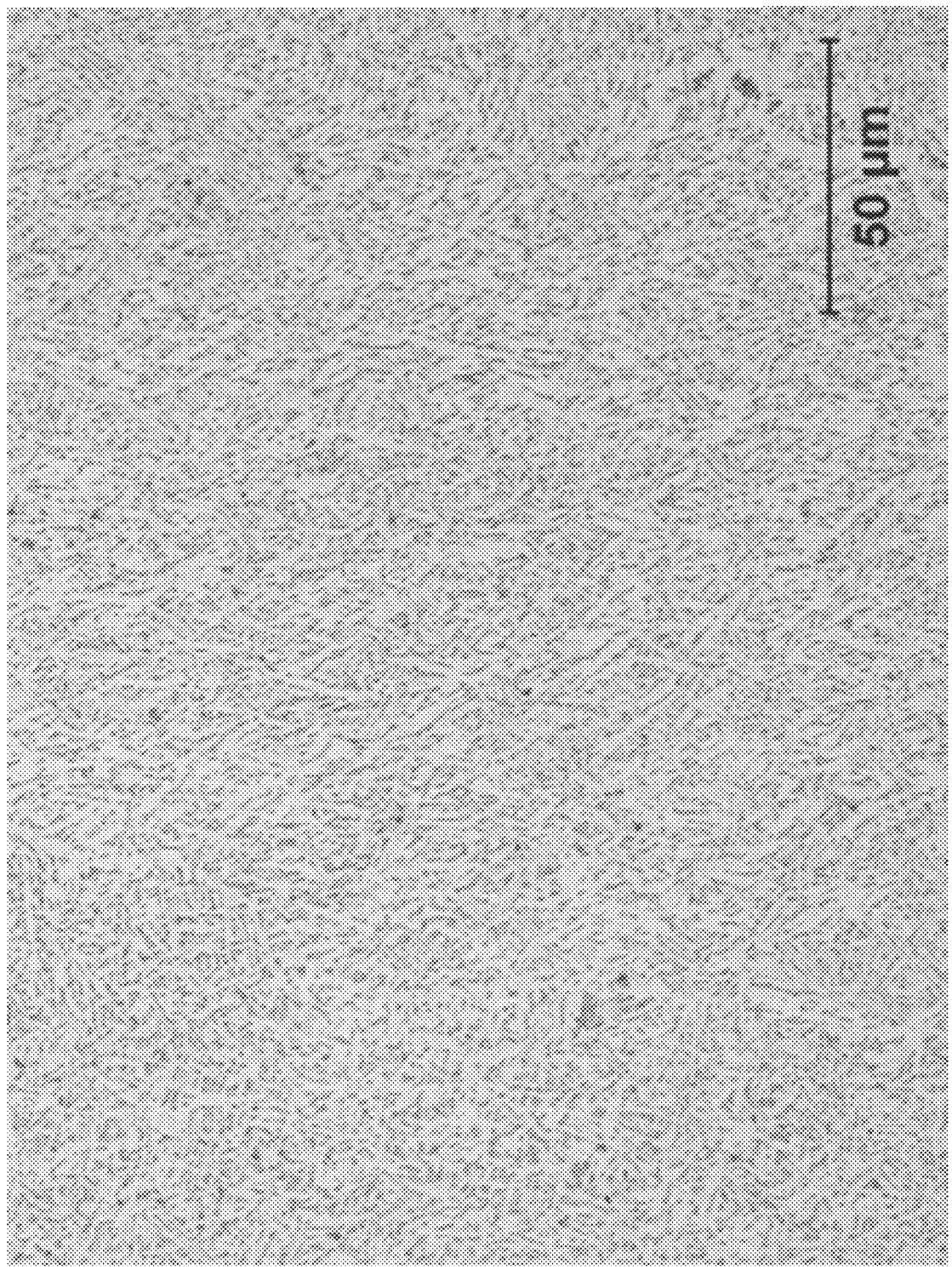
FIG. 8 is a higher magnification view of the material of FIG. 6.

FIG. 8 depicts a higher magnification image of the selectively melted and annealed material of FIG. 6. In FIG. 8, the elongated alpha structure has been eliminated, the grain size has been refined, and the microstructure is more homogenous when compared to FIG. 7.

FIG. 8 exhibits highly refined grains and an absence of elongated alpha. This represents a substantial improvement in microstructural condition because these improvements will predispose the material to superior fatigue performance over the sintered, the annealed, and the HIPed conditions.

Fatigue performance of these material was evaluated using the rotating beam method. These tests are typically performed on an R.R. Moore type testing apparatus using an un-notched specimen. Runout was evaluated at ten million cycles. The unhomogenized selectively melted annealed and then HIPed article exhibiting the microstructure of FIG. 7 displayed a fatigue strength of 70 ksi. The same material after homogenization via thermohydrogen treatment (as depicted in FIG. 8) exhibited a fatigue strength of 93 ksi. This is in excess of a thirty percent increase in fatigue performance. This is also commercially significant because it meets or exceeds the performance of typical wrought plate.

Discussion of Elevated Oxygen Content:

Further increases in fatigue performance beyond those obtained solely through thermohydrogen treatment can be gained by increasing the oxygen content of the alloy. While oxygen is understood to be a solid solution strengthener in titanium alloy systems, it is also normally understood to be detrimental to the fatigue performance and fracture resistance of these alloys. Oxygen is typically limited to 1300 ppm or 1500 ppm and occasionally it is allowed as high as 2000 ppm. There are no high strength titanium alloys used in performance critical applications that have oxygen levels specified in excess of 2000 ppm.

Higher oxygen limits can be found in some casting specifications, but casting made to these specifications are not suitable for critical application and have lower mechanical properties, and especially low elongation. Further exception occurs with unalloyed and very low alloy (less than 1 percent) titanium materials. These are special purpose materials and are not regarded as high strength materials. As a general guideline high strength titanium article would have combination of a minimum yield strength of 105 ksi, a minimum ultimate tensile strength of 120 ksi, and a minimum elongation of 8%.

The use of elevated oxygen to strengthen Ti-6Al-4V is disclosed by Abkowitz in US20140377119A1. Sintered and sintered an HIPed microstructures are disclosed. FIG. 1 of Abkowitz shows a lamellar microstructure.

The elevated oxygen levels contemplated in the present disclosure include those ranging from approximately 2000 ppm to over 4000 ppm, including any figure within that range, specifically 2500 ppm, 3000 ppm, 3500 ppm, or over 4000 ppm.

As an example, a sintered and HIPed Ti-6Al-4V alloy having an oxygen content of 3000 ppm will demonstrate very good static tensile properties of 145 ksi ultimate tensile strength, 135 ksi yield strength, and 18% elongation. However, the fatigue performance of this material is unacceptably low. At a run-out of ten million cycles this material demonstrated a fatigue strength of 60 ksi.

The microstructure that accompanies a sintered and HIPed Ti-6Al-4V alloy is lamellar in nature and is understood to perform well in static conditions, but not dynamic.

Yet, by applying thermohydrogen treatment to the additively manufactured Ti-6Al-4V article with elevated oxygen, the material is refined and equiaxed and can circumvent the shortcomings of its original lamellar microstructure and exhibit improved dynamic performance.

Microstructural improvements provided by thermohydrogen treatment have been shown in experimentation to raise the fatigue strength to 98 ksi or higher, over a 60% increase. The microstructural improvements transform this material from a poor material to a superior material, exhibiting value and utility for the teachings of this disclosure. Further gains in performance can be seen at oxygen levels above 3500, 4000, and 4500 ppm.

This is significant because it is opposite of conventional thinking about the impact of oxygen on the fatigue strength of titanium and titanium alloys. While the increase in static tensile properties has been long understood, that increase was always thought to be accompanied by greatly diminished dynamic and fatigue properties.

There is a strong basis for this teaching. Titanium alloys having high oxygen have previously and consistently demonstrated poor fatigue performance. The importance nuance in the present techniques is the particular refinement of the high oxygen material via thermohydrogen processing to provide an improved microstructure.

Powder based additive manufacturing is particularly suited to produce material having elevated oxygen because the oxygen content of the raw material can be more easily manipulated than conventional mill products. One approach to achieve this is to blend oxide particles or alloy particles having a high oxygen content with powder having a conventional oxygen content to achieve the desired final oxygen content. Other approaches include oxidizing the raw powder or formed parts, or specifying a higher oxygen content in the mill material used as feedstock for the powder making operation.

Elevating oxygen while simultaneously improving the microstructure via hydrogen chemical treatment can have many previously uncontemplated advantages. The microstructural improvements accompanying thermohydrogen treatment allow the alloy to overcome the previously accepted notion that oxygen is inherently detrimental to fatigue performance and offers applicability to a wide array of applications previously thought of as impossible.

A unique aspect of this invention is the ability to expand the performance and thus the utility of a given alloy without changing its metallic composition.

As an example, the Ti-6Al-4V alloy became the workhouse of the medical implant industry because of its availability and strength, not its particular suitability to any specific implant application. In fact, many other alloys have been developed with demonstrated improvements over the Ti-6Al-4V alloy. These improvements include alloys having more biocompatible alloying components or better matching of the alloy's modulus to that of bone. Yet these materials are rarely adopted because of the incredibly high cost of demonstrating that a new alloy is acceptable for human implant.

The surgical implant industry often encounters limitations of the Ti-6Al-4V alloy from a fatigue perspective. Many total joint replacement components have very demanding fatigue performance requirements, an excellent example of which are femoral hip stems. The space that total joint replacements have to function within is limited by anatomy and it is often desired to make the joint smaller, or to apportion certain functional areas of the joint, such as the bearing surface, more volume than other areas of the replacement joint. However, the structural areas of the joint must retain enough material to perform their functions and this often constrains the design. The desire to make these joints smaller and less invasive, or to enhance their design, is stymied by the physical performance of the Ti-6Al-4v alloy.

Design windows of Ti-6AL-4V allow can be significantly expanded by improving the mechanical performance of the widely accepted Ti-6AL-4V alloy without changing its alloying components or biocompatibility. Thus, the substantial costs related to clinical testing of a new implantable alloy need not be incurred.

Similar advantages can be seen in other applications. Creep resistance is an important characteristic in many technical applications. While it is understood that raising the oxygen content can improve the creep resistance of the Ti-6Al-4V alloy, the increased oxygen still drastically reduces fatigue strength. By raising the oxygen content and refining the microstructure via hydrogen thermal treatment, these limitations can be overcome.

The creep gains seen in the Ti-6AL-4V alloy can be improved upon by using an alloy developed specifically for creep resistance such as Ti-6Al2Sn4Zr2Mo—Si. The specification of this alloy limits the oxygen content to 1500 ppm. Normally, elevating the oxygen content above this maximum would embrittle the alloy, but the refined microstructure provided by thermohydrogen treatment more than offsets this to offer improved creep resistance while still providing good fatigue resistance and durability.

Another application benefiting from the present invention is ultrasonics. Titanium is a preferred material for ultrasonic horns or other elements used for ultrasonic transmission. However, ultrasonic systems are designed and tuned around very specific alloy compositions and changing the alloy can impact the ultrasonic performance of the system or device. Not unlike the orthopedic industry, the ultrasonic industry developed their designs around the Ti-6Al-4V alloy. Because of the high vibrating frequency seen in ultrasonic applications, fatigue performance can be a consideration. Raising the oxygen content while refining the microstructure can provide increased strength and fatigue performance to titanium element without negatively impacting is ultrasonic performance.

Consideration of Temperature Uniformity:

The process of thermohydrogen treatment has been known for some time and a tremendous amount of research has been undertaken on the process, demonstrating that it may be used to improve mechanical properties via refinement of the microstructure.

However, despite the previous efforts, thermohydrogen treatment has never been successfully commercialized. While this could be attributed to many factors such as an industry reluctance to use hydrogen, limitations of the cross-sections that can be successfully processed, the challenges of controlling oxygen or other source of contamination during processing or the cost and complexity of the additional processing steps, it is believed that a fundamental issue of temperature furnace atmosphere uniformity was not addressed in the prior work.

The thermohydrogen process is effective over a fairly wide temperature range, and the specific temperatures are dependent on the alloy being treated. For example, the temperatures and ranges discussed herein. Because the process is effective over a broad range, the importance of precise temperature uniformity and control has been overlooked. In atmosphere furnaces (as opposed to high vacuum) it is very challenging to create a uniform temperature environment. Due to the exothermic nature of the hydriding process, thermohydrogen processing presents more challenges than other heat-treating processes that do not experience exotherms during the thermal cycle.

The practicality is that in such an environment, the control instruments may not provide an accurate reflection of the temperature of the product, or the uniformity of temperature across the processing environment. What this means in practice is that parts are subjected to different temperatures within the furnace, and as a result the parts have varying mechanical properties. This a nuanced statement because each location and corresponding condition in the furnace may, at first examination, create adequate mechanical performance, but because of the variation in the environment the resulting composite process is quite varied and statistical analysis will indicate that a furnace environment with too great of a temperature range will not be capable of consistently providing acceptable product.

This problem is overcome by taking careful measures to reduce the temperature variation in the furnace. While the process "works" at many temperature ranges, it does not "work" across all of them simultaneously. Simply stated, it has been found that the more uniform the furnace environment is, the more consistent the final product will be. This may seem self-evident because reduction in variation is generally a central tenet of quality control, however aspects of this type of processing such as the exotherms associated with hydriding and the convective nature of heat-treating atmospheres where large volumes of gas are being absorbed by the articles extraordinarily exacerbate the temperature variation in the heating environment and extra care must be taken to reduce the temperature variation.

It is not unusual to see temperature vary by 100° C. across a furnace. While most furnaces can readily control to a setpoint temperature via a closed loop feedback control, this only addresses the area immediately in the vicinity of the controlling temperature sensor. This is a challenge in many types of furnaces including those processing at ambient, sub-ambient, or super-ambient pressures.

As mentioned before the thermohydrogen process is made more difficult to control by the exotherms associated with the uptake of hydrogen by the titanium articles. This release of heat must be accommodated by the furnace design. Also, if the furnace is not operating at a high vacuum, natural convection within the furnace will create large temperature gradients throughout the furnace. Again, these must be remedied by the furnace design. Some approaches to remedy this type of challenge include adding fans within the furnace to force circulation of the gases and/or constructing the interior of the furnace to accommodate even distribution of the forced gases.

By meticulous design of the furnace and thermal profiles, the temperature uniformity can be greatly improved and the consistency of the parts across the furnace can be improved to the degree needed to demonstrate run-to-run consistency and predictability.

In some embodiments of the present invention, these features are considered and implemented. Careful development and improvement of these furnaces conditions has demonstrated that a uniformity of +/−14 degrees Celsius during the creation of hydride beta phase is instrumental in narrowing the span of properties and that a uniformity of +/−10° C. or less is preferable. Further, a uniformity of +/−10 degrees Celsius during the dehydriding step is instrumental in narrowing the span of properties and a uniformity of +/−3° C. or less is preferable. Pyrometry is a common industrial concern and standards exist for its practice. Varying levels of temperature uniformity are specified in Aerospace Materials Specification 2750E "Pyrometry" and these range from +/−28° C. to +/−3° C., including 14° C., 10° C., 8° C., and 6° C. Of course, other temperature uniformity setpoints may also be selected for example the preferred range of +1-14° C. or +/−10° C.

In practice the two most critical parts of the cycle are the creation of the hydride beta phase by holding the parts above the hydrogen depressed transus and the removal of the hydrogen via vacuum. Both of these are typically performed during dwells rather than ramps and the discussion of uniformity is focused on the uniformity during these dwells. While temperature control is always an important element of thermal processing, the initial hydriding step and the eutectoid transformation step are not as sensitive to variations in temperature.

It is understood that the temperature of the furnace may increase slightly during the exothermic events; the importance of the invention is in that uniformity across the furnace during those events is maintained.

The improved process includes processing a titanium article by introducing hydrogen into the article to lower the beta transus temperature. The article is then heated to above the lowered beta transus temperature to form a hydride beta phase while maintaining the furnace temperature uniformity at +/−14° C. or more preferably +/−10° C. or below. Following this the temperature is lowered to below the eutectoid transformation point, to affect a eutectoid transformation. Following this the article is heated in vacuum (dehydriding) to remove the hydrogen and result in a processed article. Dehydriding is preferred to be undertaken at +/−14° C. or below, or more preferably +/−10° C. or below. By stating "or below" it is to be understood that these temperature variations can fall within the bounds identified or within ranges less than those bounds. By way of example, a range of +/−10° C. or below would encompass ranges of +/−9° C. or below, +/−8° C. or below, +/−7° C. or below, etc.

An improved process includes processing a titanium alloy having an oxygen content greater than 2000 ppm by introducing hydrogen into the article to lower the beta transus. The article is then heated to above the beta transus to form a hydrided beta phase while maintaining the furnace temperature uniformity at +/−14° C. or more preferably +/−10° C. or below. Following this the temperature is lowered to below the eutectoid transformation point. Following this the article is heated in vacuum to result in a processed article. Dehydriding is preferred to be undertaken at +/−14° C. or more preferably +/−10° C. or less.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The present invention has industrial applicability in the field of metallurgy.

We claim:

1. A method of modifying the physical characteristics of a base titanium alloy article previously manufactured through a selective melting process to a near net shape, said method comprising:
 introducing hydrogen through a thermohydrogen process to a base titanium alloy article previously manufactured through a selective melting process and being anisotropic and coarse grained, resulting in a titanium alloy article exhibiting a more isotropic and fine grained equiaxed microstructure;
wherein the base titanium alloy article has an oxygen content above 2500 ppm.

2. The method of claim 1, wherein said resulting titanium article is anisotropic or coarse grained.

3. The method of claim 1, wherein the resulting titanium alloy article exhibits an isotropic and fine grained equiaxed microstructure with a grain size below 100 microns.

4. The method of claim 1, wherein the resulting titanium alloy article exhibits an isotropic and fine grained equiaxed microstructure with a grain size below 50 microns.

5. The method of claim 1, wherein the resulting titanium alloy article exhibits an isotropic and fine grained equiaxed microstructure with a grain size below 20 microns.

6. The method of claim 1, wherein the resulting titanium alloy article exhibits an isotropic and fine grained equiaxed microstructure with a grain size below 10 microns.

7. The method of claim 1, wherein the step of introducing hydrogen through a thermohydrogen process includes:
introducing hydrogen into the base titanium alloy article to lower its beta transus temperature;
heating the base titanium article above the lowered beta transus temperature to form hydrided beta;
lowering the temperature of the base titanium alloy article to affect a eutectoid transformation;
dehydriding the base titanium alloy article via vacuum heating.

8. The method of claim 7, wherein the temperature resulting from the step of heating the base titanium article above the lowered beta transus temperature to form hydrided beta is performed in a furnace having a temperature uniformity of any one of +/−28° C. or below, +/−14° C. or below, +/−10° C. or below, +/−8° C. or below, +/−6° C. or below, or +/3° C. or below.

9. The method of claim 8, wherein the temperature resulting from the step of heating the base titanium article above the lowered beta transus temperature to form a hydrided beta is performed in a furnace having a temperature uniformity of +/−6° C. or below.

10. The method of claim 7, wherein the temperature resulting from the step of dehydriding the base titanium alloy article via vacuum heating is performed in a furnace having a temperature uniformity of any one of +/−28° C. or below, +/−14° C. or below, +/−10° C. or below, +/−8° C. or below, +/−6° C. or below, or +/−3° C. or below.

11. The method of claim 10, wherein the temperature resulting from the step of dehydriding the base titanium alloy article via vacuum heating is performed in a furnace having a temperature uniformity of +/−6° C. or below.

12. The method of claim 1, wherein the step of introducing hydrogen introduces 0.4 weight percent hydrogen or higher.

13. The method of claim 1, wherein the step of introducing hydrogen introduces 0.5 weight percent hydrogen or higher.

14. The method of claim 1, wherein the step of introducing hydrogen is between 0.5 weight percent hydrogen and 1.5 weight percent hydrogen.

15. The method of claim 1, wherein the base titanium alloy article has an oxygen content above 3000 ppm.

16. The method of claim 1, wherein the base titanium alloy article is a surgical implant.

17. The method of claim 1, wherein the base titanium alloy article is a femoral hip stem.

18. The method of claim 1, wherein the resulting titanium alloy article exhibits a fatigue performance equivalent or better than wrought material of the same titanium alloy.

19. The method of claim 1, wherein the base titanium alloy article is manufactured by a first entity and the step of introducing hydrogen through a thermohydrogen process is conducted by a second entity.

20. The method of claim 1, wherein the base titanium alloy article is manufactured at a first facility and the step of introducing hydrogen through a thermohydrogen process is conducted at a separate facility from the first facility.

21. The method of claim 1, further comprising hot isostatic pressing of the base article or the resulting article.

22. The method of claim 1, further comprising hot isostatic pressing the base article prior to the step of introducing hydrogen.

23. A method of modifying the physical characteristics of a base alpha/beta titanium alloy article previously manufactured through a selective melting process to a near net shape, said method comprising:
introducing hydrogen through a thermohydrogen process to a base alpha/beta titanium alloy article previously manufactured through a selective melting process and being anisotropic and coarse grained, resulting in a titanium alloy article exhibiting a more isotropic and fine grained equiaxed microstructure;
wherein the base alpha/beta titanium alloy article has an oxygen content above 2000 ppm.

24. The method of claim 23, wherein said base alpha/beta titanium alloy is Ti-6Al-4V.

25. The method of claim 23, wherein the step of introducing hydrogen through a thermohydrogen process includes:
introducing hydrogen into the base alpha/beta titanium alloy article to lower its beta transus temperature;
heating the base alpha/beta titanium article above the lowered beta transus temperature to form hydrided beta;
lowering the temperature of the base alpha/beta titanium alloy article to affect a eutectoid transformation;
dehydriding the base alpha/beta titanium alloy article via vacuum heating.

26. The method of claim 25, wherein the temperature resulting from the step of heating the base alpha/beta titanium article above the lowered beta transus temperature to form hydrided beta is performed in a furnace having a temperature uniformity of any one of +/−28° C. or below, +/−14° C. or below, +/−10° C. or below, +/−8° C. or below, +/−6° C. or below, or +/3° C. or below.

27. The method of claim 25, wherein the temperature resulting from the step of heating the base alpha/beta titanium article above the lowered beta transus temperature to form a hydrided beta is performed in a furnace having a temperature uniformity of +/−6° C. or below.

28. The method of claim 25, wherein the temperature resulting from the step of dehydriding the base alpha/beta titanium alloy article via vacuum heating is performed in a furnace having a temperature uniformity of any one of +/−28° C. or below, +/−14° C. or below, +/−10° C. or below, +/−8° C. or below, +/−6° C. or below, or +/3° C. or below.

29. The method of claim 25, wherein the temperature resulting from the step of dehydriding the base alpha/beta titanium alloy article via vacuum heating is performed in a furnace having a temperature uniformity of +/−6° C. or below.

* * * * *